(12) United States Patent
Xia

(10) Patent No.: US 11,307,444 B2
(45) Date of Patent: Apr. 19, 2022

(54) DISPLAY PANEL AND DISPLAY DEVICE

(71) Applicant: Shenzhen China Star Optoelectronics Semiconductor Display Technology Co., Ltd., Shenzhen (CN)

(72) Inventor: Rong Xia, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 187 days.

(21) Appl. No.: 16/645,509

(22) PCT Filed: Jan. 6, 2020

(86) PCT No.: PCT/CN2020/070433
§ 371 (c)(1),
(2) Date: Mar. 9, 2020

(87) PCT Pub. No.: WO2021/128456
PCT Pub. Date: Jul. 1, 2021

(65) Prior Publication Data
US 2021/0389620 A1 Dec. 16, 2021

(30) Foreign Application Priority Data
Dec. 24, 2019 (CN) .......................... 201911350950.6

(51) Int. Cl.
*G02F 1/1333* (2006.01)

(52) U.S. Cl.
CPC .... *G02F 1/13332* (2021.01); *G02F 1/133314* (2021.01); *G02F 1/133331* (2021.01); *G02F 2202/28* (2013.01)

(58) Field of Classification Search
CPC .......... G02F 1/13332; G02F 1/133314; G02F 1/133331; G02F 2202/28
See application file for complete search history.

(56) References Cited

U.S. PATENT DOCUMENTS

| | | | |
|---|---|---|---|
| 9,664,938 B2 | 5/2017 | Arita | |
| 9,989,792 B2 | 6/2018 | Hao et al. | |
| 10,216,022 B2 | 2/2019 | Arita | |
| 2013/0258237 A1* | 10/2013 | Zhang | G02F 1/133308 349/60 |
| 2013/0329395 A1 | 12/2013 | Tsai et al. | |
| 2014/0285746 A1* | 9/2014 | Huang | G02F 1/133608 349/58 |
| 2015/0177449 A1* | 6/2015 | Uchida | G02B 6/0091 362/611 |

(Continued)

FOREIGN PATENT DOCUMENTS

| | | |
|---|---|---|
| CN | 102193219 | 9/2011 |
| CN | 103365459 | 10/2013 |

(Continued)

*Primary Examiner* — Jia X Pan

(57) ABSTRACT

The present invention discloses a display panel and a display device. The display panel includes: a backlight module including a light-exiting side; and a display module including: a liquid crystal panel disposed on the light-exiting side of the backlight module, a surface glass attached to a surface of the liquid crystal panel away from the backlight module, and a front frame component disposed around the display module and fixing the display module to the backlight module.

10 Claims, 1 Drawing Sheet

(56) References Cited

U.S. PATENT DOCUMENTS

| | | | |
|---|---|---|---|
| 2016/0062523 A1 | 3/2016 | Jeong | |
| 2016/0259201 A1* | 9/2016 | Que | G02F 1/133308 |
| 2018/0292702 A1 | 10/2018 | Kiyohara | |
| 2019/0137682 A1* | 5/2019 | Ohki | G02B 6/0088 |
| 2019/0250452 A1* | 8/2019 | Yang | G02F 1/133308 |
| 2019/0353950 A1* | 11/2019 | Jin | H05K 5/03 |

FOREIGN PATENT DOCUMENTS

| | | |
|---|---|---|
| CN | 104199206 | 12/2014 |
| CN | 107993567 | 5/2018 |
| CN | 110136598 | 8/2019 |
| JP | 2015-087468 | 5/2015 |

\* cited by examiner

DISPLAY PANEL AND DISPLAY DEVICE

RELATED APPLICATIONS

This application is a National Phase of PCT Patent Application No. PCT/CN2020/070433 having International filing date of Jan. 6, 2020, which claims the benefit of priority of Chinese Patent Application No. 201911350950.6 filed on Dec. 24, 2019. The contents of the above applications are all incorporated by reference as if fully set forth herein in their entirety.

FIELD AND BACKGROUND OF THE INVENTION

The present invention is related to the field of display technology, and specifically to a display panel and a display device.

Display devices can transform computer data into various characters, numbers, symbols, or intuitive images for display and can use keyboards and other input tools to input commands or data into computers, and add, delete, and change the display at any time with help of system hardware and software. The display devices are classified into types of plasma, liquid crystal, light-emitting diode, and cathode ray tube according to the display device used.

Liquid crystal displays (LCDs) use liquid crystal materials as fundamental components. The liquid crystal materials fill a space between two parallel plates. Arrangements of molecules inside the liquid crystal materials are changed by voltages to achieve purposes of light-shielding and light-transmission for displaying different shades of images. As long as three primary color filter layers are disposed between the two parallel plates, color images can be displayed.

Touch screens, as known as touch panels, are inductive LCDs that can receive input signals such as touches. When images on touch screens are touched, haptic feedback systems can drive various connection devices according to pre-programmed programs, which can be used to replace mechanical button panels, and use images of LCDs to create moving audio and video effects.

Infrared touch screens are composed of infrared emitting and receiving sensors disposed on outer frames thereof. They form infrared detection networks on surfaces of the infrared touch screens. Any touching object can change infrared on contact points to complete touch screen operations.

A principle of the infrared touch screens is similar to a principle of surface acoustic wave touch screens, and it uses the infrared emitting and receiving sensors to form the infrared detection networks. Touching objects (e.g., fingers) can change infrared on contact points and are transformed into coordinate positions of touches to complete the touch screen operations. In an infrared touch screen, infrared emitting tubes and infrared receiving tubes are disposed on a circuit board and arranged on four sides of the infrared touch screen to form infrared matrices intersected horizontally and vertically correspondingly.

SUMMARY OF THE INVENTION

Currently, a surface glass and a liquid crystal panel are a separate structure in a large-size infrared touch screen, which forms a gap between the surface glass and the liquid crystal panel and affects touching and viewing experiences. During assembly processes, the surface glass and the liquid crystal panel need to be repeatedly cleaned, which easily leads to rework and failures of a whole device. Therefore, it is necessary to develop a new type of display panels to solve the above problems.

A purpose of the present invention is to provide a display panel and a display device to eliminate the gap between the surface glass and the liquid crystal panel, improve the touching and viewing experiences, and solve the problems of reworking and the failures of the whole device.

In order to solve the above problems, the present invention provides a display panel including: a backlight module including a light-exiting side; and a display module including: a liquid crystal panel disposed on the light-exiting side of the backlight module, a surface glass attached to a surface of the liquid crystal panel away from the backlight module, and a front frame component disposed around the display module and fixing the display module to the backlight module. The front frame component includes four frames connected end to end, and the frame includes: a first frame body having a first end and a second end, a second frame body vertically connected to a surface of the first end near the display module, and a third frame body vertically connected to a surface of the second end away from the display module.

Furthermore, the backlight module includes an outer frame, and the outer frame includes: a first connection portion disposed on a side of the first frame body near the display module and parallel to the first frame body, a second connection portion disposed on a side of the third frame body away from the display module and parallel to the first frame body, and a third connection portion connected between the first connection portion and the second connection portion and parallel to the third frame body.

Furthermore, the third frame body of the frame is fixedly connected to the third connection portion of the outer frame.

Furthermore, the third frame body of the frame is fixedly connected to the third connection portion of the outer frame by a method including one or more of screwing, riveting, nailing, and welding.

Furthermore, the third frame body includes an upper threaded hole, the third connection portion includes a lower threaded hole corresponding to the upper threaded hole, and the upper threaded hole and the lower threaded hole are fixed to each other and penetrated by a screw.

Furthermore, the surface glass attached to the surface of the liquid crystal panel away from the backlight module through a full lamination process.

Furthermore, the display module is adhered and fixed on the second frame body of the front frame component by a double-sided adhesive.

Furthermore, the double-sided adhesive is disposed on a surface of the second frame body away from the backlight module.

Furthermore, the backlight module includes a light guide plate surrounded by the outer frame and a light source disposed between the light guide plate and the outer frame.

Another embodiment of the present invention further provides a display device including the display panel according to the present invention.

The present invention relates to the display panel and the display device, which integrates the surface glass and the liquid crystal panel by a full-lamination process and fixes an assembly of the surface glass and the liquid crystal panel to the backlight module by the front frame component. The gap between the surface glass and the liquid crystal panel is eliminated and the touching and viewing experiences are improved. Meanwhile, display effects of the display panel are improved, the failures of the display panel during the assembly processes are reduced, assembly processes of the display panel are reduced, and assembly costs of the display panel are greatly reduced.

BRIEF DESCRIPTION OF THE SEVERAL VIEWS OF THE DRAWINGS

In order to describe technical solutions in the present invention clearly, drawings to be used in the description of embodiments will be described briefly below. Obviously, drawings described below are only for some embodiments of the present invention, and other drawings may be obtained by those skilled in the art based on these drawings without creative efforts.

Figure 1:
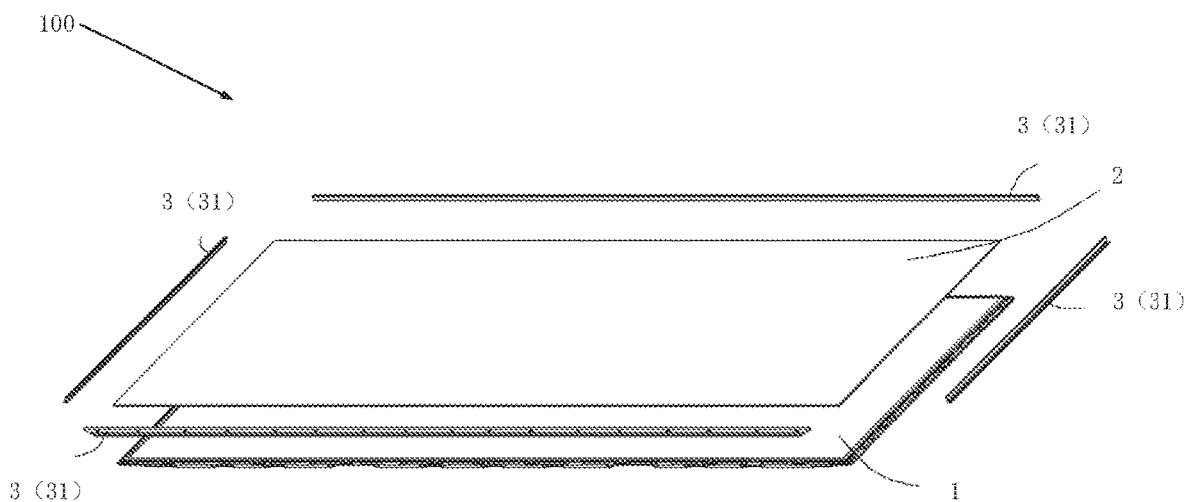
FIG. 1 is a structural diagram of a display panel of the present invention.

REFERENCE SIGNS display panel 100, backlight module 1, display module 2, front frame component 3, double-sided adhesive 4, outer frame 11, light guide plate 12, light source 13, optical film 14, first connection portion 111, second connection portion 112, third connection portion 113, liquid crystal panel 21, surface glass 22, frame 31, first frame body 311, second frame body 312, third frame body 313, first end 3111, and second end 3112.

DESCRIPTION OF SPECIFIC EMBODIMENTS OF THE INVENTION

To further explain the technical means and effect of the present invention, the following refers to embodiments and drawings for detailed description. Obviously, the described embodiments are only for some embodiments of the present invention, instead of all embodiments. Based on the embodiments of the present invention, all other embodiments obtained by those skilled in the art without creative work fall into a protection scope of the present invention.

Directional terms mentioned in the present invention, such as upper, lower, front, rear, left, right, in, out, side, etc., only refer to directions in the accompanying drawings. Thus, the adoption of directional terms is used to describe and understand the present invention, but not to limit the present invention. In addition, the terms "first" and "second" are merely used for illustrative purposes only, but are not to be construed as indicating or imposing a relative importance or implicitly indicating the number of technical features indicated. Thus, a feature that defines "first" or "second" may expressly or implicitly include one or more of the features. In the description of the present invention, the meaning of "plural" is two or more, unless otherwise specified.

In the present invention, unless otherwise specifically stated and defined, terms "connected", "fixed", etc. should be interpreted expansively. For example, "fixed" may be fixed connection, also may be detachable connection, or integration; may be mechanical connection, also may be electrical connection; may be direct connection, also may be indirect connection through an intermediate, and may be internal communication between two elements or interaction of two elements, unless otherwise specifically defined. The ordinary skill in this field can understand the specific implication of the above terms in the present disclosure according to specific conditions.

In the present invention, unless otherwise specifically stated and defined, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Various embodiments or examples are provided here below to implement the different structures of the present invention. To simplify the disclosure of the present invention, description of the components and arrangements of specific examples is given below. Of course, they are only illustrative and not limiting the present invention. Moreover, in the present invention, reference numbers and/or letters may be repeated in different embodiments. Such repetition is for the purposes of simplification and clearness, and does not denote the relationship between respective embodiments and/or arrangements being discussed. Furthermore, the present invention provides various examples for specific process and materials. However, it is obvious for a person of ordinary skill in the art that other processes and/or materials may alternatively be utilized.

An embodiment of the present invention provides a display device including a display panel 100.

As shown in FIG. 1, the display panel 100 includes a backlight module 1, a display module 2, and a front frame component 3.

Figure 2:
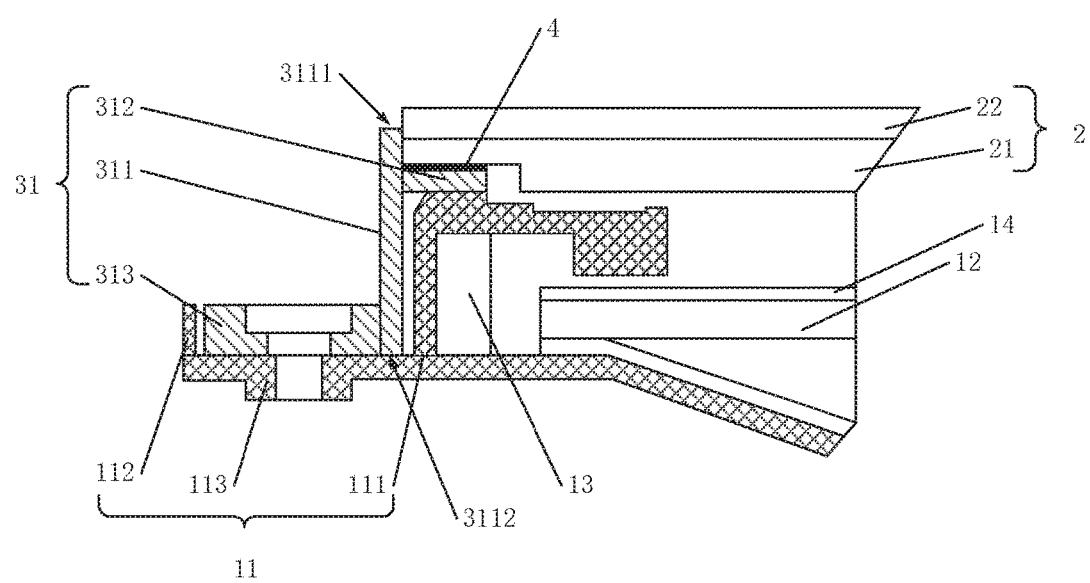
FIG. 2 is a side view diagram of the display panel of the present invention.

As shown in FIGS. 1 and 2, the backlight module 1 includes a light-exiting side. The light-exiting side is a side of the backlight module 1 facing the display module 2.

As shown in FIGS. 1 and 2, the display module 2 includes a liquid crystal panel 21 and a surface glass 22. The liquid crystal panel 21 is disposed on the light-exiting side of the backlight module 1. The surface glass 22 is attached to a surface of the liquid crystal panel 21 away from the backlight module 1.

The surface glass 22 is attached to the surface of the liquid crystal panel 21 away from the backlight module 1 by a full-lamination process. The full-lamination process completely adhered the liquid crystal panel 21 and the surface glass 22 without a gap by a water adhesive or an optical adhesive. The full-lamination process can prevent the display module 2 from forming the gap between the liquid crystal panel 21 and the surface glass 22, which improves touching and viewing experiences, well isolates dust and water vapor, reduces a thickness of the display panel 100, and achieves better display effects.

As shown in FIGS. 1 and 2, the front frame component 3 is disposed around the display module 2 and fixes the display module 2 to the backlight module 1.

As shown in FIGS. 1 and 2, the front frame component 3 includes four frames 31 connected end to end. Each frame 31 includes a first frame body 311 having a first end 3111 and a second end 3112, a second frame body 312 vertically connected to a surface of the first end 3111 near the display module 2, and a third frame body 313 vertically connected to a surface of the second end 3112 away from the display module 2.

The display module 2 is adhered and fixed on the second frame body 312 of the front frame component 3 by a double-sided adhesive 4. The double-sided adhesive 4 is disposed on a surface of the second frame body 312 away from the backlight module 1.

As shown in FIG. 2, the backlight module 1 includes an outer frame 11. The outer frame 11 includes a first connection portion 111 disposed on a side of the first frame body 311 near the display module 2 and parallel to the first frame body 311, a second connection portion 112 disposed on a side of the third frame body 313 away from the display module 2 and parallel to the first frame body 311, and a third connection portion 113 connected between the first connection portion 111 and the second connection portion 112 and parallel to the third frame body 313.

The third frame body 313 of the frame 31 is fixedly connected to the third connection portion 113 of the outer frame 11. The display module 2 is fixed to the front frame component 3 by the double-sided adhesive 4, and the third frame body 313 of the frame 31 is fixedly connected to the third connection portion 113 of the outer frame 11, which implements an effect of integrating the display module 2 and the backlight module 1. Therefore, the display effects of the display panel 100 are improved, failures of the display panel 100 during the assembly processes are reduced, assembly processes of the display panel are reduced, and assembly costs of the display panel 100 are greatly reduced.

Specifically, the third frame body 313 of the frame 31 is fixedly connected to the third connection portion 113 of the outer frame 11 by a method including one or more of screwing, riveting, nailing, and welding.

Take the screwing as an example. The third frame body 313 includes an upper threaded hole. The third connection portion 113 includes a lower threaded hole corresponding to the upper threaded hole. The upper threaded hole and the lower threaded hole are fixed to each other and penetrated by a screw.

The backlight module 1 further includes a light guide plate 12 and a light source 13. The light guide plate 12 is surrounded by the outer frame 11. The light guide plate 12 is generally made of acrylic with high light transmittance, and its surface is very smooth and flat. Most of internal light is regularly and totally reflected on a flat surface and is not emitted outside the light guide plate 12. Therefore, light emitted from the light source 13 is converted into a surface light source and incident into an optical film 14 on the light guide plate 12.

The light source 13 is disposed between the light guide plate 12 and the outer frame 11. Specifically, the light source 13 is disposed between the light guide plate 12 and the first connection portion 111 of the outer frame 11.

In the above embodiments, the description of each embodiment has its own emphasis. For a part that is not described in detail in one embodiment, reference may be made to related descriptions in other embodiments.

Although the present invention has been disclosed above by the preferred embodiments, the preferred embodiments are not intended to limit the invention. One of ordinary skill in the art, without departing from the spirit and scope of the present invention, can make various modifications and variations of the present invention. Therefore, the scope of the claims to define the scope of equivalents.

What is claimed is:

1. A display panel, comprising:
a backlight module comprising a light-exiting side and an outer frame; and
a display module comprising:
a liquid crystal panel disposed on the light-exiting side of the backlight module,
a surface glass attached to a surface of the liquid crystal panel away from the backlight module, and
a front frame component disposed around the display module and fixing the display module to the backlight module, wherein the front frame component comprises four frames connected end to end, and the frame comprises:
a first frame body having a first end and a second end,
a second frame body vertically connected to a surface of the first end near the display module, and
a third frame body vertically connected to a surface of the second end away from the display module;
wherein the outer frame of the backlight module comprises:
a first connection portion disposed on a side of the first frame body near the display module and parallel to the first frame body,
a second connection portion disposed on a side of the third frame body away from the display module and parallel to the first frame body, and
a third connection portion connected between the first connection portion and the second connection portion and parallel to the third frame body;
wherein the third frame body of the frame comprises an upper threaded hole, the third connection portion comprises a lower threaded hole corresponding to the upper threaded hole, and the third frame body is fixedly connected to the third connection portion of the outer frame by a screw penetrating the upper threaded hole and the lower threaded hole.

2. The display panel as claimed in claim 1, wherein the surface glass attached to the surface of the liquid crystal panel away from the backlight module through a full lamination process.

3. The display panel as claimed in claim 1, wherein the display module is adhered and fixed on the second frame body of the front frame component by a double-sided adhesive.

4. The display panel as claimed in claim 3, wherein the double-sided adhesive is disposed on a surface of the second frame body away from the backlight module.

5. The display panel as claimed in claim 1, wherein the backlight module comprises a light guide plate surrounded by the outer frame and a light source disposed between the light guide plate and the outer frame.

6. A display device, comprising a display panel as claimed in claim 1, wherein the display panel comprises:
a backlight module comprising a light-exiting side and an outer frame; and
a display module comprising:
a liquid crystal panel disposed on the light-exiting side of the backlight module,
a surface glass attached to a surface of the liquid crystal panel away from the backlight module, and
a front frame component disposed around the display module and fixing the display module to the backlight module, wherein the front frame component comprises four frames connected end to end, and the frame comprises:
a first frame body having a first end and a second end,
a second frame body vertically connected to a surface of the first end near the display module, and
a third frame body vertically connected to a surface of the second end away from the display module;

wherein the outer frame of the backlight module comprises:
- a first connection portion disposed on a side of the first frame body near the display module and parallel to the first frame body,
- a second connection portion disposed on a side of the third frame body away from the display module and parallel to the first frame body, and
- a third connection portion connected between the first connection portion and the second connection portion and parallel to the third frame body;

wherein the third frame body of the frame comprises an upper threaded hole, the third connection portion comprises a lower threaded hole corresponding to the upper threaded hole, and the third frame body is fixedly connected to the third connection portion of the outer frame by a screw penetrating the upper threaded hole and the lower threaded hole.

7. The display device as claimed in claim 6, wherein the surface glass attached to the surface of the liquid crystal panel away from the backlight module through a full lamination process.

8. The display device as claimed in claim 6, wherein the display module is adhered and fixed on the second frame body of the front frame component by a double-sided adhesive.

9. The display device as claimed in claim 8, wherein the double-sided adhesive is disposed on a surface of the second frame body away from the backlight module.

10. The display device as claimed in claim 6, wherein the backlight module comprises a light guide plate surrounded by the outer frame and a light source disposed between the light guide plate and the outer frame.

* * * * *

UNITED STATES PATENT AND TRADEMARK OFFICE
CERTIFICATE OF CORRECTION

PATENT NO. : 11,307,444 B2
APPLICATION NO. : 16/645509
DATED : April 19, 2022
INVENTOR(S) : Rong Xia Page 1 of 1

It is certified that error appears in the above-identified patent and that said Letters Patent is hereby corrected as shown below:

On the Title Page

Item (73) Assignee:
"Shenzhen China Star Optoelectrenics Semiconductor Display Technology Co., Ltd."

Should be changed to:
--Shenzhen China Star Optoelectronics Semiconductor Display Technology Co., Ltd.--

Signed and Sealed this
Twentieth Day of September, 2022

Katherine Kelly Vidal
*Director of the United States Patent and Trademark Office*